US010299625B2

(12) United States Patent
Cabrera

(10) Patent No.: US 10,299,625 B2
(45) Date of Patent: May 28, 2019

(54) GRILL AND TABLE COMBINATION

(71) Applicant: Carlos Antonio Cabrera, Miramar, FL (US)

(72) Inventor: Carlos Antonio Cabrera, Miramar, FL (US)

(*) Notice: Subject to any disclaimer, the term of this patent is extended or adjusted under 35 U.S.C. 154(b) by 54 days.

(21) Appl. No.: 15/182,153

(22) Filed: Jun. 14, 2016

(65) Prior Publication Data
US 2017/0354295 A1 Dec. 14, 2017

(51) Int. Cl.
A47J 37/07 (2006.01)
(52) U.S. Cl.
CPC ....... A47J 37/0713 (2013.01); A47J 37/0704 (2013.01); A47J 37/0763 (2013.01); A47J 2037/0777 (2013.01)
(58) Field of Classification Search
CPC .... A47J 37/0704; A47J 31/0763; F24B 1/205
USPC .......... 99/449, 450, 340; 126/25 R, 9 B, 9 R
See application file for complete search history.

(56) References Cited

U.S. PATENT DOCUMENTS

| | | | | |
|---|---|---|---|---|
| 1,582,346 A | * | 4/1926 | Oster | F24C 1/16 108/29 |
| 2,497,156 A | * | 2/1950 | Davis | A47B 3/10 126/37 R |
| 2,780,474 A | * | 2/1957 | Farah | A45F 3/46 126/25 A |
| 4,369,763 A | * | 1/1983 | Sullivan | A47J 36/26 108/50.18 |
| 4,895,131 A | * | 1/1990 | Overholser | A47J 37/0713 126/25 R |
| 2001/0017131 A1 | * | 8/2001 | Sim | A47J 37/0704 126/25 A |
| 2010/0139642 A1 | * | 6/2010 | Pliml | A47J 37/0704 126/25 R |

* cited by examiner

Primary Examiner — Reginald Alexander
(74) Attorney, Agent, or Firm — William D. Hare, Esq.; McNeely, Hare & War, LLP

(57) ABSTRACT

The invention relates to a grill system for grilling food. The grill system includes a grill surface, a first side surface, a second side surface and a rear surface. The grill surface has four sides and is generally horizontal and surrounded on multiple sides by vertical walls to form an enclosure below the grill surface. The first side surface is adjacent to a first side of the grill surface and the second side surface is adjacent to a second side of the grill surface. The second side surface is on an opposite side of the grill surface from the first side surface. The rear surface is positioned adjacent to a third side of the grill surface and extends between the first side surface and the second side surface. The first side surface, the second side surface and the rear surface are foldable between a first generally horizontal orientation that is generally planar with the grill surface and a second generally vertical orientation that is generally perpendicular to the grill surface.

20 Claims, 7 Drawing Sheets

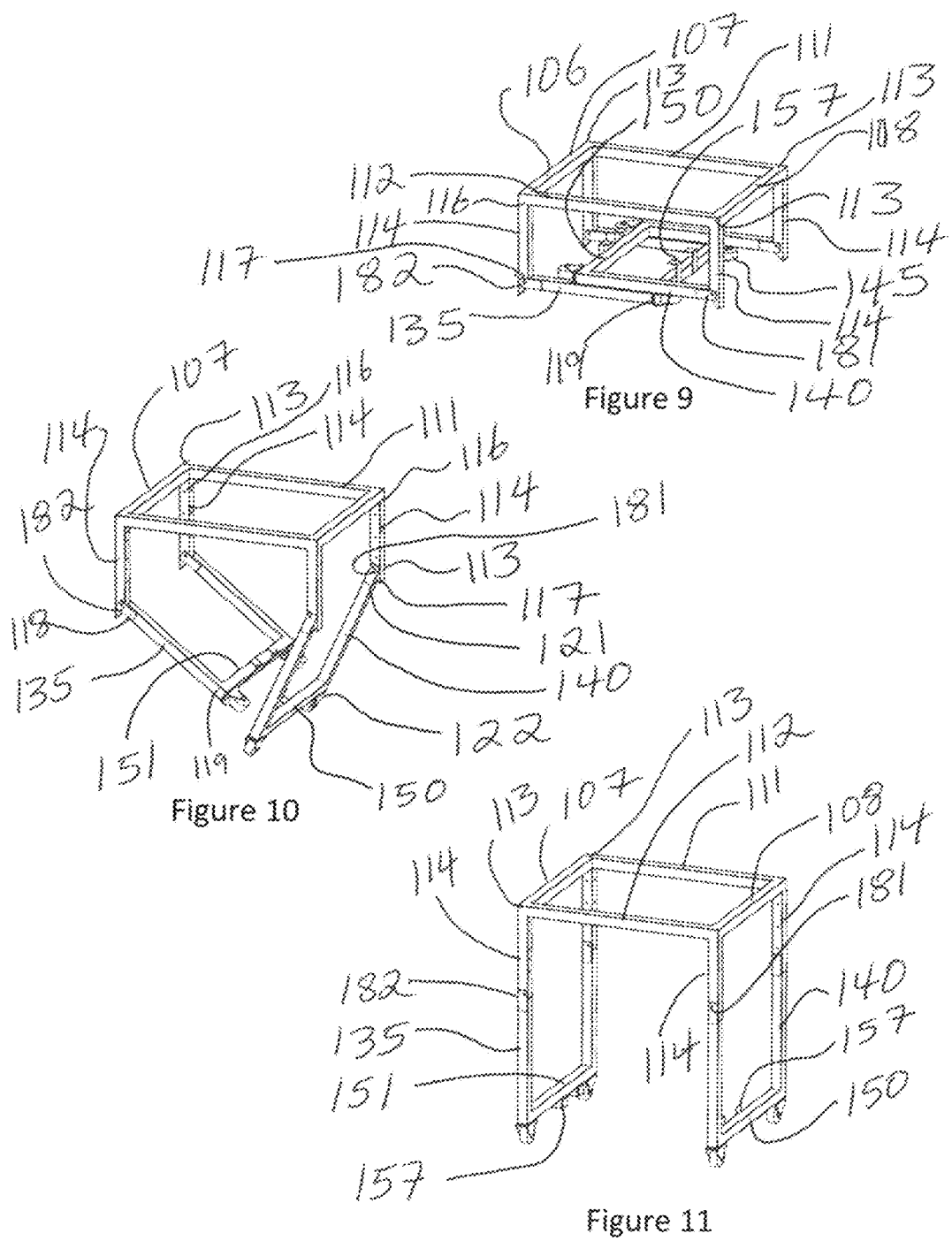

GRILL AND TABLE COMBINATION

TECHNICAL FIELD

The field of the invention generally relates to portable grills, such as hibachi grills for barbequing.

BACKGROUND

Most households own a grill for barbequing. The food is cooked on the grill and then transported from the grill to a table for serving and eating. Where the weather conditions are suitable, many households have an outdoor table so that the grilled meal can be enjoyed outdoors.

Referring to FIG. 1, US 2014/0165992 discloses a conventional barbeque grill 10 that includes rigid support legs 15, a control panel 20, an optional side grill 25 on one side, an optional shelf 30 on the opposite side, and a cover 35 enclosing one or more burners. The interior of the grill includes the burners positioned below a cast iron grill surface. To operate the grill, a propane tank is mounted to the grill with a line to provide propane gas to the burners. As illustrated in FIG. 1, US 2014/0165992 includes a pair of wheels 40 that permit the user to more easily change the position of the grill, for example on a grill or patio, than if all of the support legs were without wheels. Although the grill can be repositioned, such a grill disclosed in US 2014/0165992 is not considered to be portable.

US 2015/0251678 discloses a convention grill mounted to a folding cart. When folded, the cart has a pair of wheels and a handle such that the user can pull the cart and grill.

US D736,029 discloses an electric table top grill. A user can place the grill on a table top, cook a meal, and serve the meal at the table. Such an electric tablet top grill does not have support legs.

SUMMARY OF THE INVENTION

In one general aspect, the invention relates to a grill system for grilling food. The grill system includes a grill surface, a first side surface, a second side surface and a rear surface. The grill surface has four sides and is generally horizontal and surrounded on multiple sides by vertical walls to form an enclosure below the grill surface. The first side surface is adjacent to a first side of the grill surface and the second side surface is adjacent to a second side of the grill surface. The second side surface is on an opposite side of the grill surface from the first side surface. The rear surface is positioned adjacent to a third side of the grill surface and extends between the first side surface and the second side surface. The first side surface, the second side surface and the rear surface are foldable between a first generally horizontal orientation that is generally planar with the grill surface and a second generally vertical orientation that is generally perpendicular to the grill surface.

Embodiments of the grill system may include one or more of the following features. For example, the first side surface, the second side surface and the rear surface may form a continuous planar surface. The first side surface, the second side surface and the rear surface may form a continuous planar surface that is coplanar with the grill surface. The first side surface, the second side surface and the rear surface may form a continuous planar surface that is vertically offset from a plane formed by the grill surface.

The grill surface may be surrounded on three of four sides by the combination of the first side surface, the second side surface and the rear surface.

The grill system may further include a pair of left legs positioned on a left side of the grill and a pair of right legs positioned on a right side of the grill. The left legs and the right legs are movable from a first vertical orientation to a second horizontal orientation such that moving the left legs and the right legs to the horizontal orientation improves portability of the grill system.

The left legs and the right legs may include one or more hinges to permit the legs to be movable between the vertical orientation and the horizontal orientation. The placement of the hinge on one of the left legs or the right legs may be further from the grill surface than the hinge on the other of the left legs or right legs.

The grill system may further include wheels mounted to one or both of the left legs and the right legs.

The grill system may further include an extendable tray that retracts into and out of the enclosure below the grill surface and is positioned adjacent to the rear surface. The extendable surface may be slidable to retract under the grill region.

The grill system may further include a flat grilling surface mountable above the grill region. The flat grill surface may be without openings. The grill system may further include a grill cooking surface mountable to the grill system above the grill surface. The grill cooking surface may be made up of multiple elongated bars separated by elongated openings.

In another general aspect a grill system for grilling food, includes a grill surface, a first side surface, a second side surface and a rear surface, a pair of left legs positioned on a left side of the grill and a pair of right legs positioned on a right side of the grill.

The grill surface has four sides and is generally horizontal and surrounded on multiple sides by vertical walls to form an enclosure below the grill surface.

The first side surface is adjacent to a first side of the grill surface and the second side surface is adjacent to a second side of the grill surface such that the second side surface is on an opposite side of the grill surface from the first side surface. The rear surface is positioned adjacent to a third side of the grill surface and extends between the first side surface and the second side surface. The left legs and the right legs are movable from a first vertical orientation to a second horizontal orientation.

The first side surface, the second side surface and the rear surface form a continuous planar surface that is coplanar with the grill surface and surrounds three of the four sides of the grill surface. The first side surface, the second side surface and the rear surface are foldable between a first generally horizontal orientation that is generally planar with the grill surface and a second generally vertical orientation that is generally perpendicular to the grill surface.

Embodiments of the second aspect may include one or more of the following features. For example, the left legs and the right legs may include one or more hinges to permit the legs to be movable between the vertical orientation and the horizontal orientation. The placement of the hinge on one of the left legs or the right legs may be further from the grill surface than the hinge on the other of the left legs or right legs.

The grill system may further include wheels mounted to one or both of the left legs and the right legs.

The grill system may further include an extendable tray that retracts into and out of the enclosure below the grill surface and is positioned opposite to the rear surface. The extendable tray may be slidable to retract under the grill region.

The grill system may further include a flat grilling surface to cover or enclose the grill surface from a position above the grill surface. The flat grilling surface may be free of openings.

Further advantages and features of the invention will be understood from the drawings, description and the claims.

BRIEF DESCRIPTION OF THE DRAWINGS

FIGS. 9-11 are perspective views of a portion of the frame of the portable hibachi grill illustrating the ability to pivot the legs from a retracted position for transport or storage to an extended position for use of the grill.

DETAILED DESCRIPTION

The inventor has developed a hibachi grill system that advantageously has the features of: (a) ability to grill, (b) ability to fold the grill system into a smaller configuration for portability, and (c) extendable surfaces on at least three of four sides of the grill to function as a table for eating the grilled meal. To the knowledge of the inventor, a hibachi grill has not been developed that has extendable surfaces on at least three of four sides of the grill to provide surfaces for eating the grilled meal, much less in the form of a hibachi grill that can be folded into a smaller configuration for portability.

Figure 1:
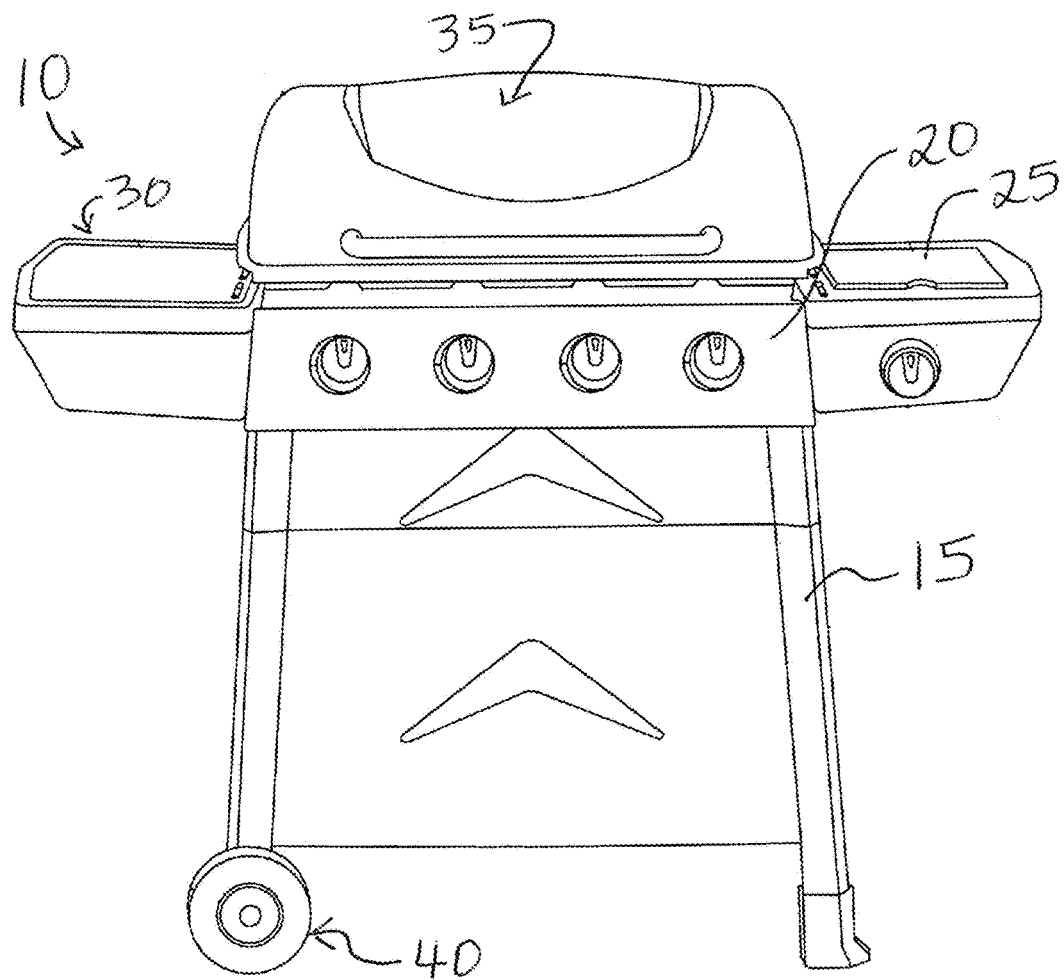
FIG. 1 is a front view of a conventional, prior art grill.
Figure 2:
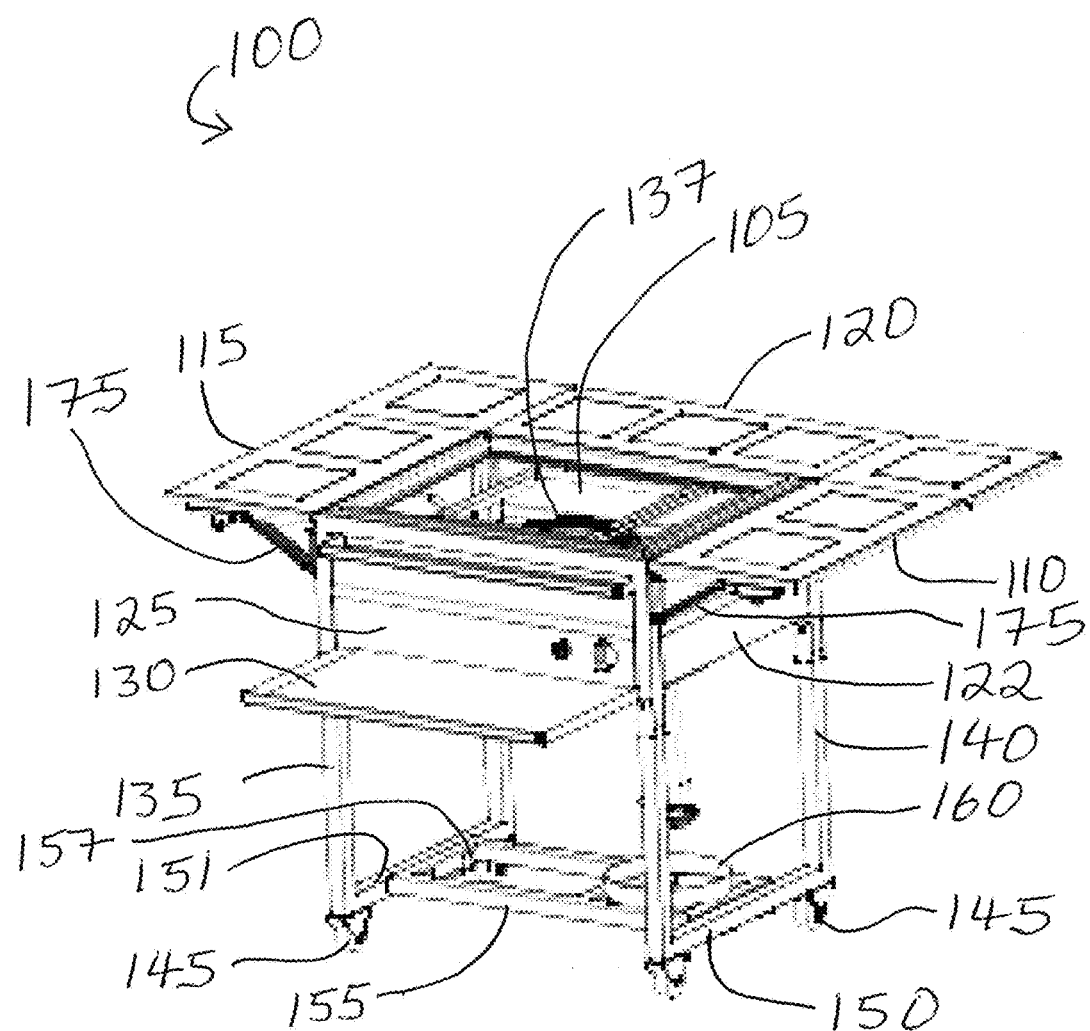
FIG. 2 is a perspective view of a portable hibachi grill having surfaces on at least three sides of the grill.
Figure 3:
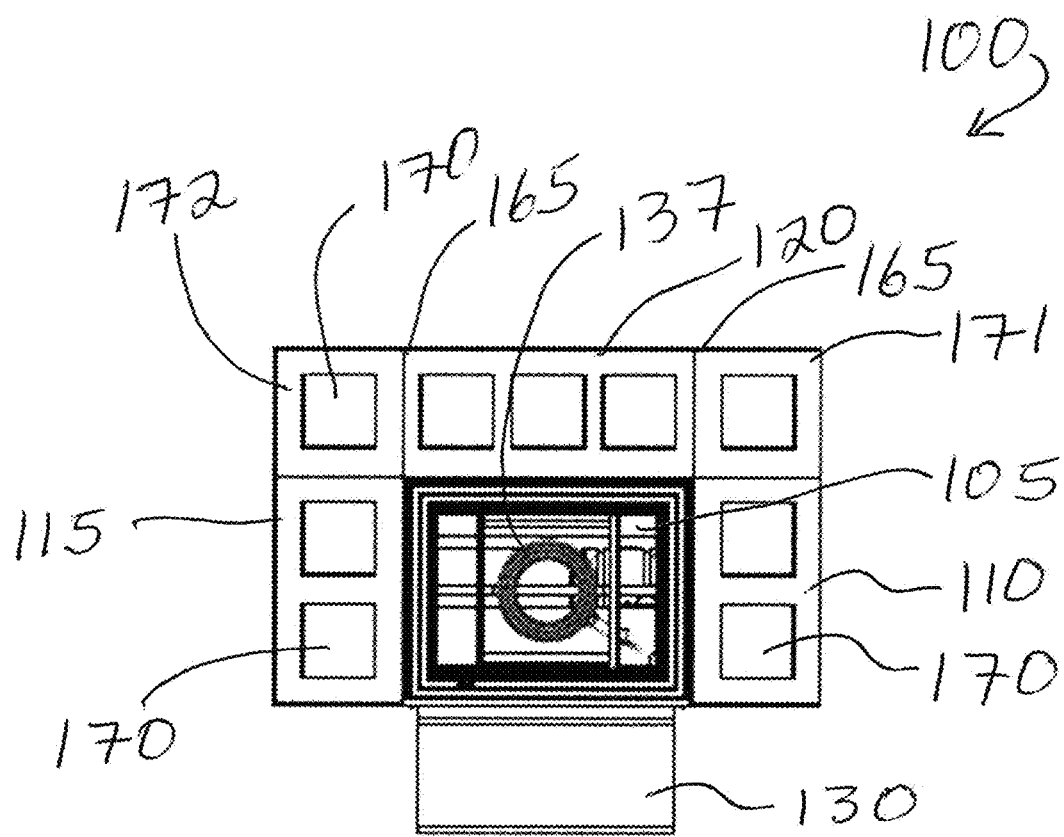
FIG. 3 is a top view of the portable hibachi grill of FIG. 2 with the surfaces in an extended position.
Figure 4:
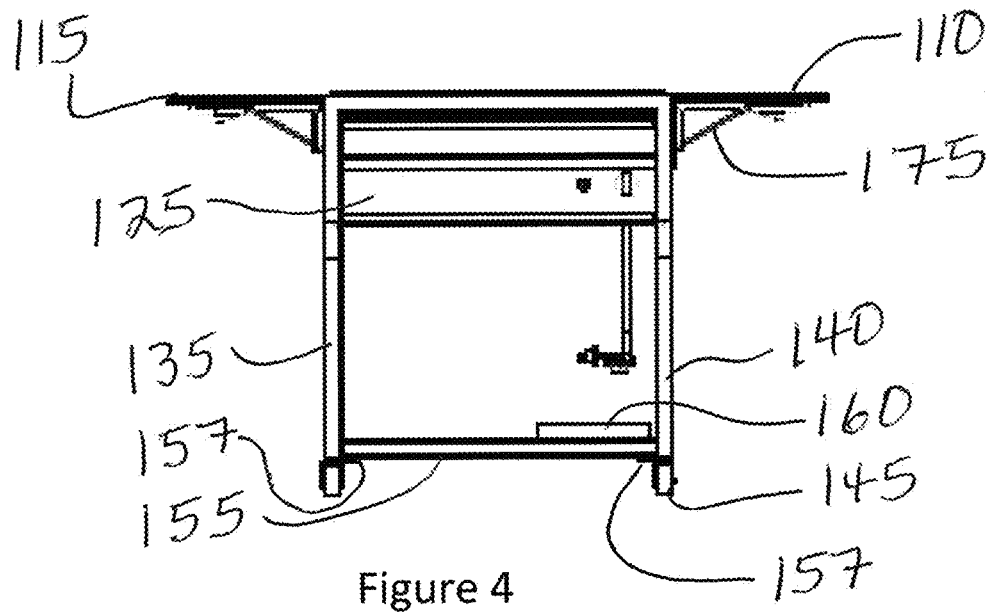
FIG. 4 is a front view of the portable hibachi grill of FIG. 2 with the surface in an extended position.
Figure 5:
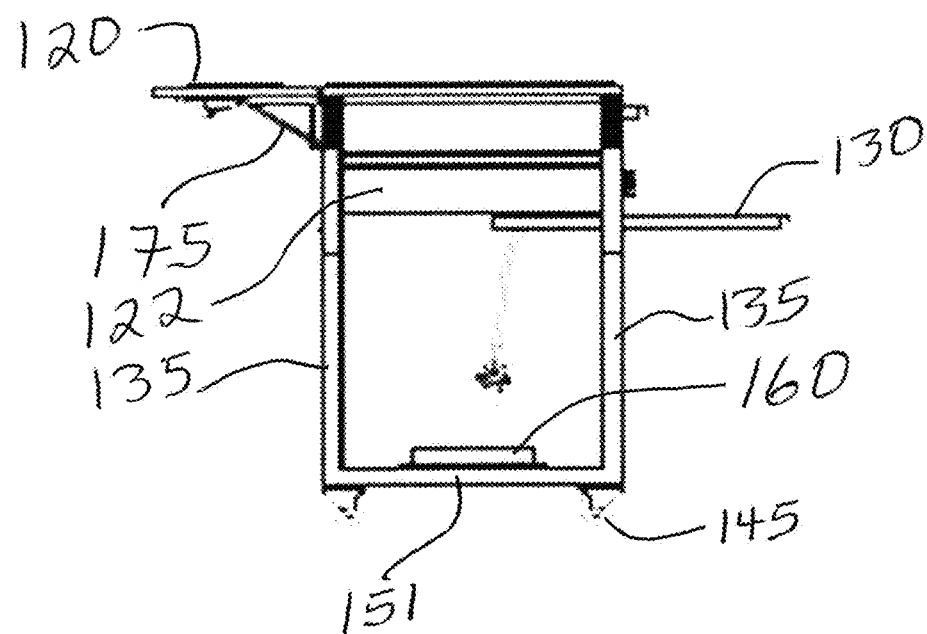
FIG. 5 is a side view of the portable hibachi grill of FIG. 2 with the surface in an extended position.
Figure 6:
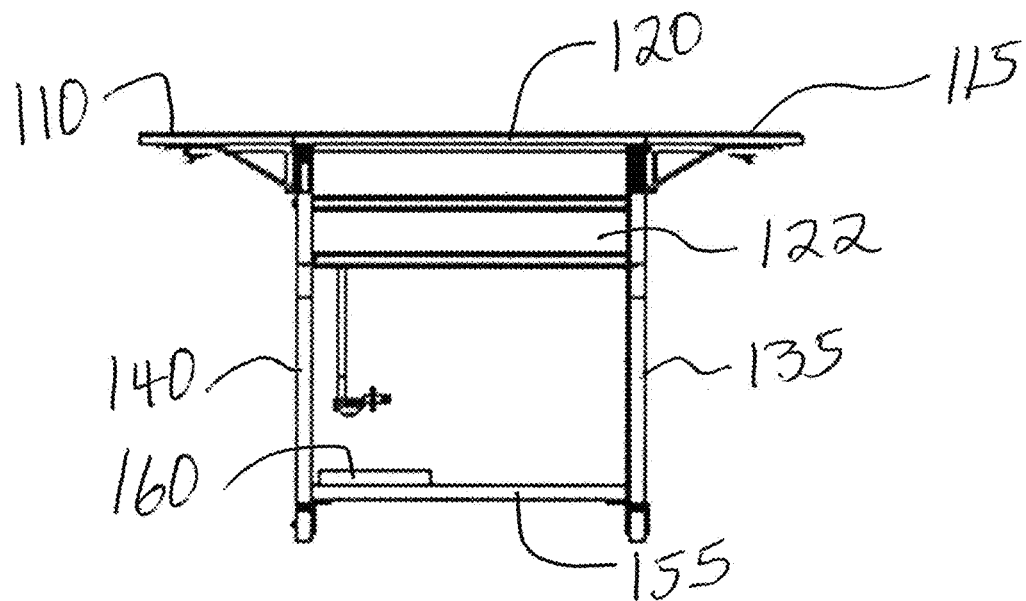
FIG. 6 is a rear view of the portable hibachi grill of FIG. 2 with the surface in an extended position.
Figure 7:
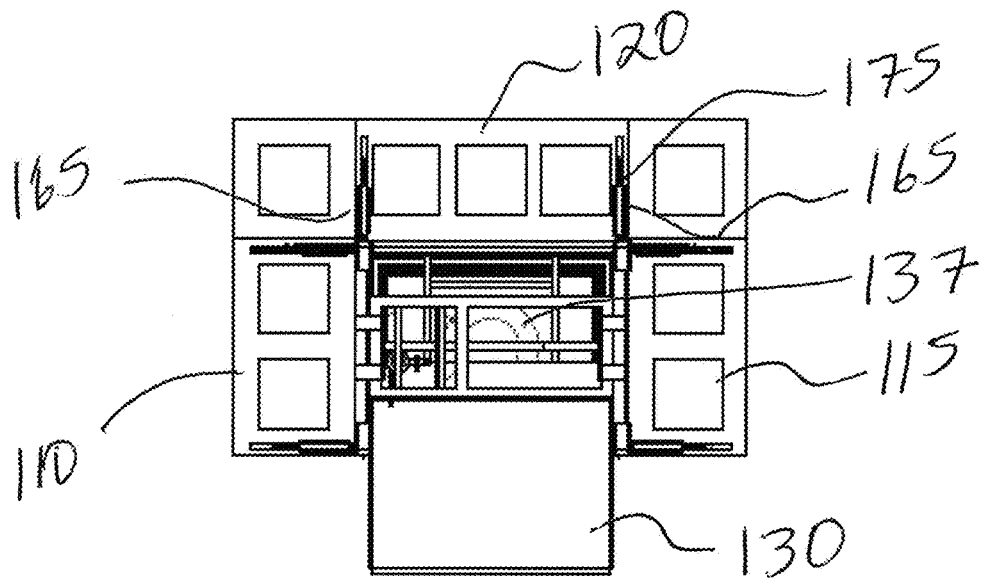
FIG. 7 is a bottom view of the portable hibachi grill of FIG. 2 with the surface in an extended position.

Referring to FIGS. 2-7, a hibachi grill system 100 includes a grill region 105, and a first side surface 110, a second side surface 115 and a rear surface 120 surrounding three sides of the grill region. The orientation of these three surfaces 110, 115, 120 are with respect to the individual operating the grill, i.e., the individual grilling on the hibachi's grill region 105. Each surface 110, 115, 120 is adjacent to a vertical wall 122 of the grill system such that in an extended position the surface is at an angle of 90 degrees to the vertical wall. For example, FIGS. 2 and 3 illustrate the side surface 110 in an extended position at an angle of 90 degrees to the vertical wall 122.

A front region 125 of the grill system 100 includes typical controls for operating the grill, e.g., button to ignite a flame on the grill, knob to control the flow of propane gas to a burner(s). The front region also contains a grease tray 130 that retracts into and out of the grill to provide the operator a tray below the grilling region 105 to catch grease and oil drippings and the like. The grease tray 130 slides along a pair of surfaces that are positioned under the grill region and a burner 137 such that the tray can be slidably retracted under the grill region and burner to catch grease or pulled all the way out to be cleaned.

Figure 8:
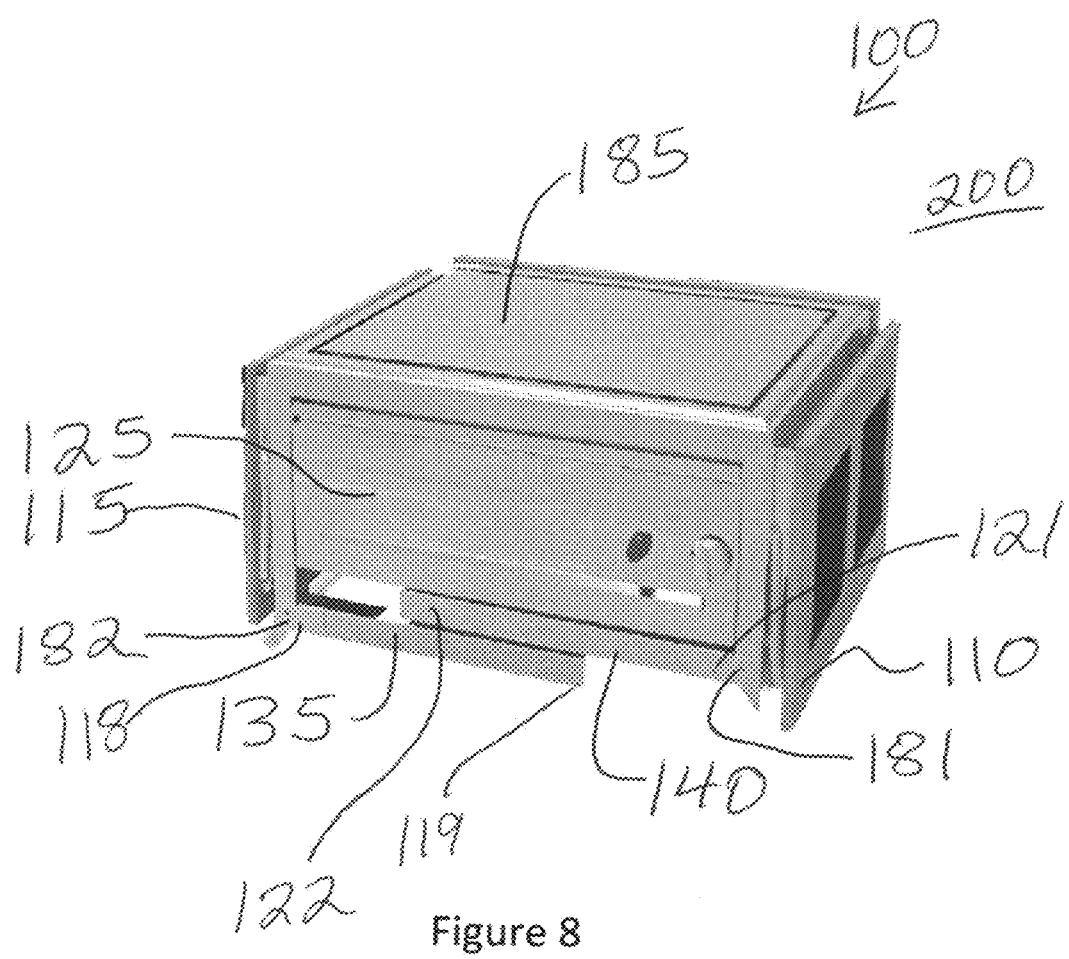
FIG. 8 is a perspective view of the portable hibachi grill of FIG. 2 with the surfaces and legs in a retracted position for easy transport.

Positioned around the grill region 105 is a frame 106 that includes four horizontally oriented portions 107, 108, 111, 112 with each pair of adjacent horizontally oriented portions being joined at approximate right angles to form four joints 113. Extending vertically from each of the four joints 113 is a vertically oriented frame portion 114 with a first end 116 in proximity to the frame and a second end 117 away from the frame. Positioned below the grill region 105 are two adjustable left legs 135 and two adjustable right legs 140. A first end 118 of each left leg 135 joins one vertically oriented frame portion 114 at a joint 182, such as a hinge, with each left leg 135 terminating at a second end 119. A first end 121 of each right leg 140 joins one vertically oriented frame portion 114 at a joint 181, such as a hinge, with each right leg 140 terminating at a second end 122. As illustrated in FIGS. 8-10, the legs 135, 140 can be folded inward to reduce the volume occupied by the grill and improve its portability. As illustrated in FIGS. 9 and 10, each left leg and each right leg is movable from a first vertical orientation to a second horizontal orientation. When moved to the second horizontal orientation the second end of one leg does not extend past the first end of an opposite leg and when the pairs of left legs and right legs are in the second horizontal orientation the legs form a bottom edge of the enclosure. The legs 135, 140 also may have optional wheels 145 to improve the movability of the grill when in use. Cross-supports 150, 151 extend between each left leg 135 (support 151) and between each right leg 140 (support 150) to provide rigidity in one direction, e.g., front-to-back support. Similarly, one or more cross supports 155 extend between the cross-supports 150, 151 to provide rigidity in a direction that is 90 degrees to the first direction and thereby provide side-to-side support. The cross-supports 150, 151 and 155 provide a solid, rigid frame for holding a mounting ring 160 to mount a propane tank to operate the grill system 100.

In one embodiment, the support 155 extends rests in one or more brackets 157 extending from support 151 and is pivotally mounted to support 150. To prepare the grill system 100 for transport or storage, the support 155 is pivoted towards the grill region 105 by lifting the support from the brackets 157 extending from support 151 and pivoting towards the right legs 140. With the support 155 flush with or between the right legs 140, the combination of the support 155 and the right legs 140 can be pivoted underneath the grill region followed by pivoting the left legs 135 underneath the grill region, as illustrated in FIG. 8.

FIGS. 9-11 illustrate a portion of the frame of the grill system 100 to illustrate the ability to extend the legs 135, 140 from a compact configuration to an extended configuration. FIGS. 9-11 also illustrate an embodiment in which the support 155 (not shown) may be mounted to both right legs 140 and left legs 135 using brackets 187 on supports 150 and 151, respectively, rather than pivoting. Once the legs 135, 140 of the grill system 100 are extended from the compact position, the support 155 is simply placed into the spaces formed by the individual brackets and the supports 150, 150. Once mounted into the brackets, the support 155 ensures the rigidity of the grill system 100.

In either embodiment, when the legs 135, 140 are folded below the grill region, the wheels 145 may be left on the legs or removed and stored separately. For example, the wheels may be mounted to the legs for easy removal or permanently attached to the legs (e.g., threadably mounted or snapped into place). FIGS. 9-11 illustrate the wheels 145 left on the legs in the compact and extended positions.

As illustrated in the top view of the hibachi grill system 100 of FIG. 3 and the perspective view of FIG. 2, the first side surface 110, second side surface 115 and rear surface 120 surrounding three sides of the grill surface are generally flush with each other to form a single contiguous surface when they are extended. The rear surface 120 includes a pair of hinges 165 that permit two portions of the rear surface 120 to be folded with respect to the remainder of the rear surface. As illustrated in FIG. 3, each side surface 110, 115 includes two serving surfaces 170. Each surface 170 is configured in size and spacing to correspond to a place setting for an individual and may be of a different material or color than the remainder of the surfaces 110, 115, 120 such that each individual's place setting area is readily apparent.

The surfaces 110, 115, 120 each includes one or more hinges 175 that permit the respective surface to fold downward against the respective vertical wall 122 to configure the grill system 100 to be in a portable configuration. As explained above, the hinge 165 permits the rear surface to be further folded in a different orientation than the hinges 175 such that the profile of the grill is further reduced in size to improve portability. When configuring the grill system 100 such that the surfaces 110, 115, 120 are extended outward, the operator would move the side surfaces 110, 115 from a vertical position against the vertical wall 122 to a horizontal position at 90 degrees to the vertical wall 122. A conventional locking mechanism, not shown, holds the side surfaces 110, 115 in the horizontal configuration. The rear surface 120 includes a similar conventional locking mechanism. However, when the rear surface 120 is moved from the retracted vertical orientation against the respective vertical wall 122, the two opposite, outer serving surfaces 171, 172 are in a folded position flush with the remainder of the rear surface 120 resulting in the rear surface being of a shorter length. Using the configuration illustrated in FIGS. 2 and 3, in the retraced configuration the two outer serving surfaces 171, 172 are flush with the two adjacent serving surfaces resulting in a thickness that is twice that of the middle serving surface 170. Once moved to the extended, horizontal position, the operator then can fold the two outer serving surfaces 171, 172 such that in combination they form a continuous single surface with both the remainder of the rear surface 120 and the two side surfaces 110, 115.

To ensure a flush, continuous single surface when the surfaces 110, 115, 120 are extended, the serving surfaces 171, 172 may have a lip that mates with an opposite, respective lip on the side surfaces 110, 115 to support the surfaces 171, 172 at the mating edge between surfaces 110, 120 and 115, 120. This configuration also ensures that when the surfaces are resting against each other, the upper surfaces as seen by the operator are flush.

Referring to FIG. 8, the grill system 100 may be folded into a reduced profile configuration 200. In the reduced profile configuration 200, the surfaces 110, 115, 120 are first folded down against the vertical surfaces 122. Next, the two adjustable right legs 140 are folded under the grill region 105 with the folding occurring at a hinge 181. Then the two adjustable left legs 135 are folded under the grill region adjacent to the two adjustable right legs 140 at a hinge 182.

As evident from FIG. 8, the lengths of left legs 135 are shorter than right legs 140 while nonetheless permitting the grill 100 to stand horizontal when the legs are extended. This results from the hinge 182 of the legs 135 being positioned at a different height along the legs 135 than the hinge 181 of the legs 140. By placing the hinge 182 further away from the grill than the positioning of the hinge 181, the legs 140 can be folded flush with the grill and the legs 135 can be folded flush and below the legs 140.

FIG. 8 illustrates the grill with a flat, stainless steel cooking surface 185 that is positioned above the burner 137 (see FIG. 3). The flat cooking surface 185 is optimal for hibachi-style cooking and may be removed and replaced with a conventional grill surface for grilling-style of cooking. As should be recognized, a conventional grill surface consists of elongated bars or rods separated by elongated spaces. With the flat cooking surface 185 the entire surface is heated by the burner. In contrast, when using a grill surface, the flame from the burner passes between the narrow metal bars that form the grill surface and directly contact the food being cooked. Like the flat cooking surface 185, the grill surface may be made of stainless steel to ensure the longevity of the grill system. Similarly, the burner 137 mounted in the grill region may be made of stainless steel to ensure its longevity.

While several particular forms of the invention have been illustrated and described, it will be apparent that various modifications and combinations of the invention detailed in the text and drawings can be made without departing from the spirit and scope of the invention. For example, references to materials of construction, methods of construction, specific dimensions, shapes, utilities or applications are also not intended to be limiting in any manner and other materials and dimensions could be substituted and remain within the spirit and scope of the invention. Accordingly, it is not intended that the invention be limited, except as by the appended claims.

What is claimed is:

1. A grill system for grilling food, the grill system comprising:
   a grill surface having four sides and being generally horizontal and surrounded on multiple sides by a frame comprising four horizontally oriented portions with each pair of adjacent horizontally oriented frame portions being fixedly joined at approximate right angles to form four joints and four vertically oriented frame portions with each frame portion fixedly joined to and extending vertically from one joint in a common orientation away from the respective joint and vertical walls being positioned between pairs of the vertically oriented frame portions to form the side walls of an enclosure below the grill surface;
   a first side surface adjacent to a first side of the grill surface;
   a second side surface adjacent to a second side of the grill surface, wherein the second side surface is on an opposite side of the grill surface from the first side surface; and
   a rear surface positioned adjacent to a third side of the grill surface and extending between the first side surface and the second side surface; and
   a pair of left legs positioned on a left side of the grill and a pair of right legs positioned on a right side of the grill, wherein each leg is movably attached to one vertically oriented frame portion and the left legs and the right legs are movable from a first vertical orientation to a second horizontal orientation, whereby moving the left legs and the right legs to the horizontal orientation forms the bottom edges of the enclosure below the grill surface;
   wherein the first side surface, the second side surface and the rear surface are foldable between a first generally horizontal orientation that is generally planar with the grill surface and a second generally vertical orientation that is generally perpendicular to the grill surface.

2. The grill system of claim 1, wherein the first side surface, the second side surface and the rear surface form a continuous planar surface.

3. The grill system of claim 1, wherein the first side surface, the second side surface and the rear surface form a continuous planar surface that is coplanar with the grill surface.

4. The grill system of claim 1, wherein the first side surface, the second side surface and the rear surface form a continuous planar surface that is vertically offset from a plane formed by the grill surface.

5. The grill system of claim 1, wherein the grill surface is surrounded on three of four sides by the combination of the first side surface, the second side surface and the rear surface.

6. The grill system of claim 1, wherein the left legs and the right legs include one or more hinges to permit the legs to be movable between the vertical orientation and the horizontal orientation.

7. The grill system of claim 6, wherein the placement of the hinge on one of the left legs or the right legs is further from the grill surface than the hinge on the other of the left legs or right legs.

8. The grill system of claim 1, further comprising wheels mounted to one or both of the left legs and the right legs.

9. The grill system of claim 1, further comprising an extendable tray that retracts into and out of the enclosure below the grill surface and is positioned opposite to the rear surface.

10. The grill system of claim 9, wherein the extendable tray is slidable to retract under the grill region.

11. The grill system of claim 1, further comprising a flat cooking surface mountable to the grill system above the grill surface, the flat cooking surface comprising a solid surface.

12. The grill system of claim 1, further comprising a grill cooking surface mountable to the grill system above the grill surface, the grill comprising multiple elongated bars separated by elongated openings.

13. A grill system for grilling food, the grill system comprising:
a grill surface having four sides and being generally horizontal and surrounded on multiple sides by vertical walls to form an enclosure below the grill surface;
a first side surface adjacent to a first side of the grill surface;
a second side surface adjacent to a second side of the grill surface, wherein the second side surface is on an opposite side of the grill surface from the first side surface;
a rear surface positioned adjacent to a third side of the grill surface and extending between the first side surface and the second side surface;
a pair of left legs positioned on a left side of the grill; and
a pair of right legs positioned on a right side of the grill, wherein the left legs and the right legs each comprise a first end in proximity to the grill surface, a second end away from the grill surface and a joint between each first end and the grill such that each left leg and each right leg is movable from a first vertical orientation to a second horizontal orientation and when moved to the second horizontal orientation the second end of one leg does not extend past the first end of an opposite leg and when the pairs of left legs and right legs are in the second horizontal orientation the left legs and right legs form bottom edges of the enclosure, and
the first side surface, the second side surface and the rear surface form a continuous planar surface that is coplanar with the grill surface and surrounds three of the four sides of the grill surface, and are foldable between a first generally horizontal orientation that is generally planar with the grill surface and a second generally vertical orientation that is generally perpendicular to the grill surface.

14. The grill system of claim 13, wherein the joint between the grill and each first end in the left legs and the right legs comprises one or more hinges to permit the legs to be movable between the vertical orientation and the horizontal orientation.

15. The grill system of claim 14, wherein the placement of the hinge on one of the left legs or the right legs is further from the grill surface than the hinge on the other of the left legs or right legs.

16. The grill system of claim 14, further comprising wheels mounted to one or both of the left legs and the right legs.

17. The grill system of claim 13 further comprising an extendable tray that retracts into and out of the enclosure below the grill surface and is positioned opposite to the rear surface.

18. The grill system of claim 17, wherein the extendable tray is slidable to retract under the grill region.

19. The grill system of claim 13, further comprising a flat cooking surface mountable above the grill surface, the flat cooking surface comprising a solid surface free of openings.

20. The grill system of claim 13, wherein the first ends of the left legs and the right legs are in a fixed orientation relative to the grill surface.

* * * * *